United States Patent
Gupta et al.

(10) Patent No.: US 9,411,571 B2
(45) Date of Patent: Aug. 9, 2016

(54) METHOD AND APPARATUS FOR DEPLOYING SOFTWARE AS A SERVICE

(71) Applicant: Adobe Systems Incorporated, San Jose, CA (US)

(72) Inventors: Saurabh Gupta, New Delhi (IN); Aditya Falodiya, Cupertino, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 24 days.

(21) Appl. No.: 13/780,107

(22) Filed: Feb. 28, 2013

(65) Prior Publication Data
US 2014/0245290 A1    Aug. 28, 2014

(51) Int. Cl.
*G06F 9/44*    (2006.01)
*G06F 9/445*   (2006.01)

(52) U.S. Cl.
CPC ........................................ *G06F 8/61* (2013.01)

(58) Field of Classification Search
None
See application file for complete search history.

(56) References Cited

U.S. PATENT DOCUMENTS

| | | | | |
|---|---|---|---|---|
| 5,920,725 A * | 7/1999 | Ma | ............................. | G06F 8/67 707/999.202 |
| 6,381,742 B2 * | 4/2002 | Forbes et al. | .................. | 717/176 |
| 6,463,373 B2 * | 10/2002 | Suganuma | .......... | B60R 16/0232 303/112 |
| 6,487,718 B1 * | 11/2002 | Rodriguez | ................. | G06F 8/63 709/203 |
| 6,704,933 B1 * | 3/2004 | Tanaka et al. | .................. | 725/132 |
| 6,721,777 B1 * | 4/2004 | Sharma | ...................... | G06F 9/50 709/227 |
| 6,892,382 B1 * | 5/2005 | Hapner | ...................... | G06F 8/60 717/168 |
| 6,907,603 B2 * | 6/2005 | Scott | .............................. | 717/168 |
| 6,961,773 B2 * | 11/2005 | Hartman | ................... | G06F 8/61 709/227 |
| 6,976,061 B1 * | 12/2005 | Sharma | ...................... | G06F 9/54 709/220 |
| 7,028,295 B2 * | 4/2006 | Li et al. | .......................... | 717/178 |
| 7,069,553 B2 * | 6/2006 | Narayanaswamy | ....... | G06F 8/61 717/173 |
| 7,213,052 B2 * | 5/2007 | Mae | ........................... | G06F 8/65 709/206 |
| 7,222,341 B2 * | 5/2007 | Forbes et al. | .................. | 717/170 |
| 7,620,948 B1 * | 11/2009 | Rowe et al. | .................... | 717/171 |
| 7,676,448 B2 * | 3/2010 | Henderson et al. | ............ | 717/171 |
| 7,779,027 B2 * | 8/2010 | James | ........................ | G06F 8/60 707/769 |
| 7,805,722 B2 * | 9/2010 | Mori et al. | ...................... | 717/178 |
| 7,930,692 B2 * | 4/2011 | Compas | .................. | H04L 29/06 717/168 |
| 7,979,854 B1 * | 7/2011 | Borole | ....................... | G06F 8/65 709/222 |
| 7,979,856 B2 * | 7/2011 | Murray | ...................... | G06F 8/61 717/173 |
| 8,204,789 B2 * | 6/2012 | Hamada | ............. | G06Q 30/0601 705/26.1 |

(Continued)

*Primary Examiner* — Tuan Q. Dam
*Assistant Examiner* — Zheng Wei
(74) *Attorney, Agent, or Firm* — Keller Jolley Preece

(57) ABSTRACT

A computer implemented method and apparatus for deploying software as a service. The method comprises defining, in metadata, dependencies between a software product and associated dependency assets that are associated with the software product, wherein the software product comprises a plurality of software product assets; receiving a request for the software product from a computer; and downloading to the computer the software product assets and associated dependency assets identified in the metadata for the computer based on an operating system and one or more capabilities of the computer.

20 Claims, 4 Drawing Sheets

(56) References Cited

U.S. PATENT DOCUMENTS

| | | | |
|---|---|---|---|
| 8,225,281 B1* | 7/2012 | Hardinger et al. | 717/120 |
| 8,418,165 B2* | 4/2013 | Hoff et al. | 717/168 |
| 8,626,806 B2* | 1/2014 | Larimore | G06F 9/45537 707/781 |
| 9,069,635 B2* | 6/2015 | Cochran | H03M 7/3084 |
| 2001/0029605 A1* | 10/2001 | Forbes et al. | 717/11 |
| 2002/0049966 A1* | 4/2002 | Lin | 717/178 |
| 2002/0112230 A1* | 8/2002 | Scott | 717/169 |
| 2003/0084439 A1* | 5/2003 | Perkins et al. | 717/177 |
| 2003/0101445 A1* | 5/2003 | Li et al. | 717/170 |
| 2004/0117785 A1* | 6/2004 | Kincaid | H04W 8/20 717/170 |
| 2005/0066324 A1* | 3/2005 | Delgado et al. | 717/170 |
| 2005/0066325 A1* | 3/2005 | Mori et al. | 717/174 |
| 2005/0097543 A1* | 5/2005 | Hirayama | 717/168 |
| 2005/0144616 A1* | 6/2005 | Hammond et al. | 717/173 |
| 2005/0210459 A1* | 9/2005 | Henderson et al. | 717/168 |
| 2005/0210464 A1* | 9/2005 | Machida | 717/174 |
| 2005/0289534 A1* | 12/2005 | Kim | G06F 8/68 717/172 |
| 2006/0031827 A1* | 2/2006 | Barfield et al. | 717/168 |
| 2006/0048144 A1* | 3/2006 | Willess | G06F 8/61 717/177 |
| 2006/0294512 A1* | 12/2006 | Seiden | G06F 8/61 717/168 |
| 2007/0038991 A1* | 2/2007 | Schuft | G06F 8/65 717/172 |
| 2007/0162905 A1* | 7/2007 | Kooijmans | G06F 8/65 717/173 |
| 2008/0172583 A1* | 7/2008 | Mahajan | G06F 11/3672 714/57 |
| 2011/0214111 A1* | 9/2011 | Vidal | 717/168 |
| 2011/0252416 A1* | 10/2011 | Kobayashi | G06F 9/4411 717/174 |
| 2011/0271275 A1* | 11/2011 | Ochi | G06F 8/63 717/177 |
| 2011/0307884 A1* | 12/2011 | Wabe et al. | 717/178 |
| 2013/0125055 A1* | 5/2013 | Nakaya et al. | 715/810 |
| 2013/0212200 A1* | 8/2013 | Dennis et al. | 709/206 |
| 2013/0227547 A1* | 8/2013 | Little | G06F 8/60 717/177 |
| 2013/0268927 A1* | 10/2013 | Cochran | G06F 8/60 717/177 |
| 2014/0101647 A1* | 4/2014 | Huang | 717/168 |
| 2014/0137097 A1* | 5/2014 | Sakai | G06F 8/65 717/172 |
| 2014/0282470 A1* | 9/2014 | Buga | G06F 8/65 717/170 |
| 2015/0082297 A1* | 3/2015 | Parry | G06F 8/65 717/173 |

* cited by examiner

METHOD AND APPARATUS FOR DEPLOYING SOFTWARE AS A SERVICE

BACKGROUND OF THE INVENTION

1. Field of the Invention

Embodiments of the present invention generally relate to software deployment and more particularly, to a method and apparatus for deploying software as a service.

2. Description of the Related Art

Software development and deployment of computer products is a challenging and complicated process often involving the work of developers who write the software code, installer engineers who author the software installer for a wide variety of platforms, and release engineers who compile and release builds for both distributable products, such as those on CDs, DVDs, and the like, as well as for web store products that are downloadable from the Internet. There are many elements of a software product that need to be packaged for deployment. Currently, in order to deploy a software product, source code is compiled, which generates application binaries. Application binaries include executables and libraries. The binaries are then packaged with an operating system specific installer.

A distributed product build typically includes a media centric installer build/package of the product. A web store build is generally a compressed package of the same installer build as the distributable product build, but with a wrapper executable that is optimized for web download. Product updates, which essentially carry incremental changes to an originally shipped product, require the same set of steps to create and deploy as the originally shipped product.

A product application is generally dependent on a number of shared technology binaries, which are also compiled, built, packaged and released with the deployed software product. In addition to the core product and the shared technology binaries, there are other elements, such as a collection of help content, a collection of language packs, and a collection of functional content are shipped with the product to enhance its usage. With every software release and/or upgrade, the created software packages, installer, and archives are created and delivered to the end user. Once the end user receives the application package, the files must be extracted and installed.

The entire release cycle to create a new application feature requires detailed release planning and engineering effort that may take several months. Users may inadvertently install the wrong application, for example, due to confusion between the 32-bit and 64-bit versions, which could result in performance issues. Further, the end user needs to download the entire application package with a full installer to get a version of software. Even when a user is informed that a software update exists, the entire process of create/compress/deploy/extract/install is required to be performed, creating a significant development and deployment burden for the software developer as well as an additional inconvenience for the end user.

Therefore, there is a need for a method and apparatus for deploying software as a service.

SUMMARY OF THE INVENTION

A method and apparatus for deploying software as a service substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
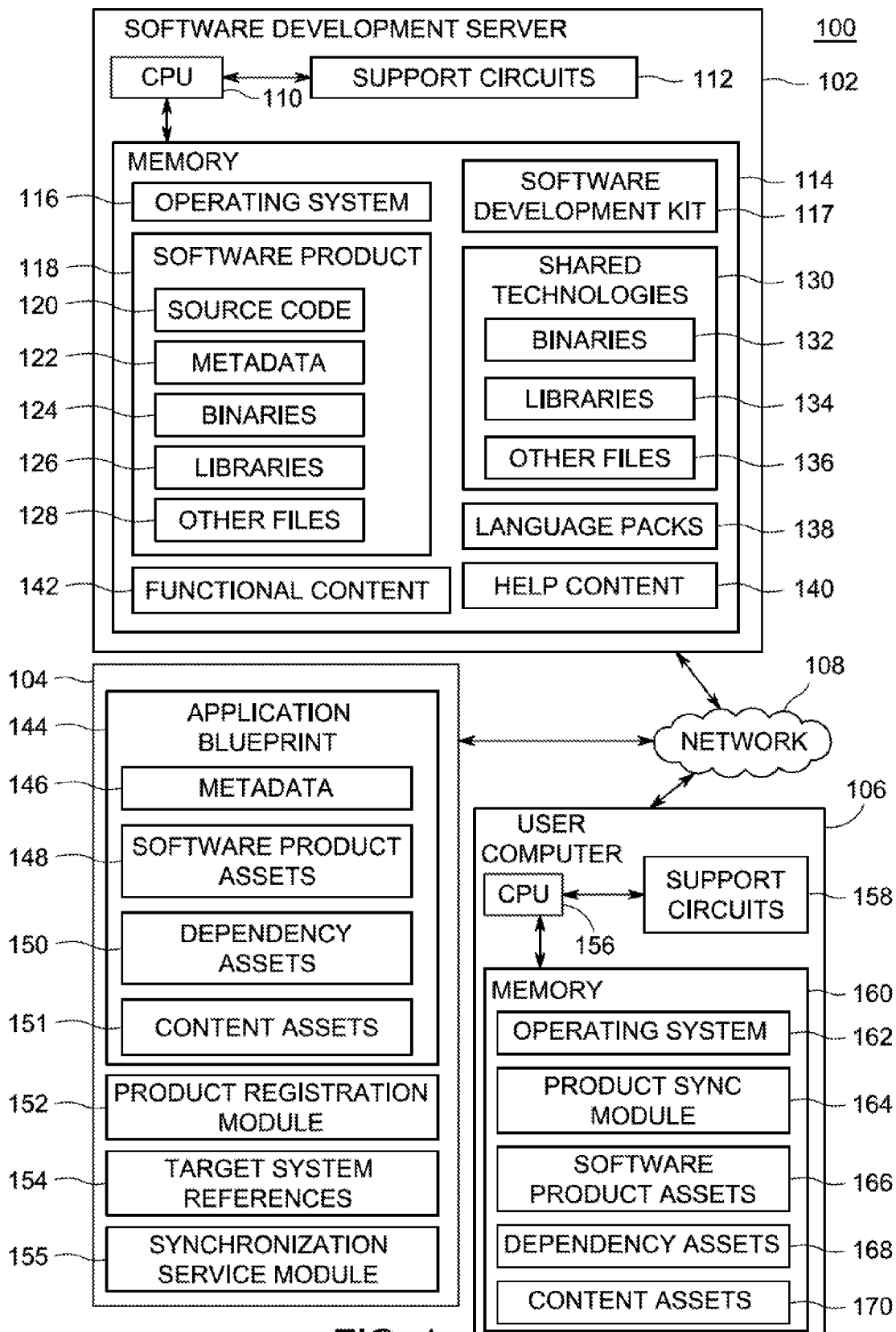
FIG. 1 is a block diagram of a system for deploying software as a service, according to one or more embodiments.

While the method and apparatus is described herein by way of example for several embodiments and illustrative drawings, those skilled in the art will recognize that the method and apparatus for deploying software as a service is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for deploying software as a service defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention include a method and apparatus for deploying software as a service. The embodiments develop software components such that a computer software application can be deployed without the need of creating complex installers or large packages and archives. In order to achieve this, the software product and its assets must be managed. The method receives an application blueprint and stores it on a staging server. The application blueprint includes core application binaries that are generated from compiled source code, core libraries, and other files specific to the software application. The application blueprint also includes shared technology binaries, shared technology libraries and other shared files used by the application. In addition, one or more dependencies may be defined. Dependencies may be established between a product and a shared technology (e.g., a library, plug-in, etc.). These dependencies indicate that a shared technology is needed on the user computer for the core product or its functions to work properly. Metadata is also stored on the staging server. Metadata describes a pre-defined schema in which the products' assets are defined and structured, including the product, product version, platform, language packs, and the like. Metadata also describes the product dependencies. Critical dependencies are shared technology assets that must be on the user computer for the core software product to work. Required dependencies are shared technology assets that must be on the user computer for a specific function of the software product to work, although most of the product's core functionality can still work without it. Recommended dependency means the shared technology asset is completely optional for the software product. Target system references are also stored on the staging server. Target system references define where (e.g., directories) to download the product assets on the user's computer.

When the application blueprint is in place on the staging server, a request may be sent to the staging server in order to request a software download. A user computer's system parameters and system capabilities, such as screen dimensions, resolution, and the like are included with the request. Using the metadata and target system references stored on the staging server, only the files specific to the requested software product are downloaded to the user's computer, based on the user computer's system parameters and capabilities. On the user computer, the software product is installed by placing the product assets and dependency assets in the directories defined by the target system references.

Similarly, software updates may be automatically downloaded to the user computer when a user logs into the server. All assets for a software product on a user computer are compared with the assets in the application blueprint on the staging server. Any assets that have been modified are automatically downloaded onto the user computer and replace the old asset.

Advantageously, the software and/or upgrades are deployed without the need to package all configurations associated with all operating systems, bit rates, languages, etc. Nor is an installer required to be developed and packaged with the software blueprint.

Various embodiments of a method and apparatus for deploying software as a service are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device, and may include a server, a desktop computer, a laptop computer, a Personal Digital Assistant (PDA), a cell phone or other stationary or mobile computing device.

FIG. 1 is a block diagram of a system 100 for deploying software as a service, according to one or more embodiments. The system 100 includes a software development server 102, a staging server 104, and a user computer 106, communicatively coupled to one another via a network 108. The software development server 102 and the staging server 104 may be on the same server. The software development server 102 includes a Central Processing Unit (CPU) 110, support circuits 112, and a memory 114. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 114 includes at least one of Read Only Memory (ROM), Random Access Memory (RAM), disk drive storage, optical storage, removable storage and/or the like.

The memory 114 includes an operating system 116, a software development kit 117, a software product 118, shared technologies 130, language packs 138, help content 140, and functional content 142. The operating system 116 may include various commercially known operating systems. The software product 118 includes source code 120, metadata 122, binaries 124, libraries 126, and other files 128 specific to the software product 118. The shared technologies 130 includes binaries 132, libraries 134, and other files 136 shared by two or more software products 118.

The staging server 104 may be any server, such as ADOBE® Creative Cloud™, capable of storing software. The staging server 104 is repository for the latest version of program files. The staging server 104 includes an application blueprint 144, a product registration module 152, target system references 154, and a synchronization service module 155. The application blueprint 144 includes metadata 146, software product assets 148, dependency assets 150, and content assets 151.

The user computer 106 includes a CPU 156, support circuits 158, and memory 160. The memory 160 includes an operating system 162, a perpetual updater 164, software product assets 166, dependency assets 168, and content assets 170.

The network 108 includes a communication system that connects computers by wire, cable, fiber optic and/or wireless link facilitated by various types of well-known network elements, such as hubs, switches, routers, and the like. The network 108 may employ various well-known protocols to communicate information amongst the network resources. For example, the network 108 may be a part of the Internet or Intranet using various communications infrastructure, such as Ethernet, Wi-Fi, Wi-Max, General Packet Radio Service (GPRS), and the like.

The source code 120 on the software development server 102 is compiled to product binaries 124, such as an executable. The software product 118 also has specific libraries 126 and other files 128 that are required for the software product 118 to function properly. The metadata 122 defines the design and specification of data structures used by the software product 118. In addition, a software product 118 is generally dependent on a number of shared technologies 130. These binaries 132, libraries 134, and other files 136 are not specific to the software product 118, but are created and shared with a plurality of software products 118. Language packs 138, help content 140, and functional content 142 are produced separate from the software product 118. The language packs 138 allow the product to be viewed in a selected language. Help content 140 includes help pages that may assist a user in using the software product 118.

Once the software product metadata 122, binaries 124, libraries 126, other files 128, shared technology binaries 132, libraries 134, other files 136, language packs 138, help content 140, and functional content 142 have been certified for deployment, the files are compressed and pushed to the staging server 104. The product registration module 152 processes the incoming files and stores them on the staging server 104 as an application blueprint 144 useful for deployment of the software product 118 on a user computer 106 and for future updates to that software product. The product registration module 152 stores the software product binaries 124, libraries 126, and other files 128 are stored as software product assets 148. Shared technology binaries 132, libraries 134, other files 136 are stored as dependency assets 150. Language packs 138, help content 140, and functional content are stored as content assets 151. Metadata 122 is stored as metadata 146. Metadata 146 defines the schema of the software product assets 148 and their structure, dependency assets 150 and their structure, and content assets 151 and their structure. Target system references 154 include one or more references to where a file asset may be mapped to a directory on a user computer 106 based on the operating system 162 of the user computer 106.

The perpetual updater 164 on the user computer 106 sends a query to the synchronization service module 155 on the staging server 104 to download a software product. The perpetual updater 164 sends information about the user computer 106, such as the operating system 162, in addition to other information such as the bitness (e.g., whether the processor is a 32-bit processor, a 64-bit processor, or a universal processor), and the like. The synchronization service module 155 accesses the metadata 146 in the application blueprint 144 for the requested software product and retrieves only those files required to run a specific version of the software product needed for proper operation of the software product on the specific type of user computer 106. The metadata 146 defines the product, the version of the product, the platform, language packs that may be locale specific, and the like. Only the files related to the platform, product version, locale, etc are deployed to the user computer 106. The target system references 154 define in which directories the downloaded files are to be stored. The perpetual updater 164 receives and installs the appropriate files on the user computer 106.

When a software update is available, the perpetual updater 164 sends information about the installed application files to the synchronization service module 155. The synchronization service module 155 assesses what software product assets 148, dependency assets 150, and content assets 151 have been updated since a user has last logged into the staging server 104. Any updated assets 148, 150, 151 are downloaded to the user computer 106 to replace the software assets 166, dependency assets 168 and content assets 170 on the user computer 106.

Advantageously, deployment as a service provides for quick software release, bypassing the entire traditional complex process of creating installers, archives, and packages. It also synchronizes incremental changes in the application onto the user computer.

Figure 2:
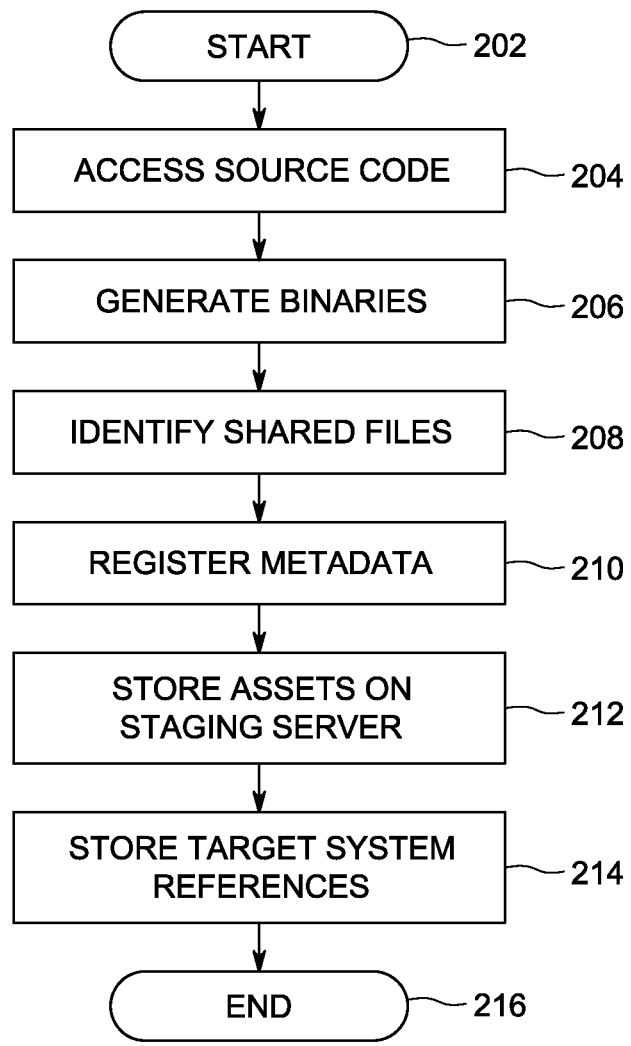
FIG. 2 depicts a flow diagram of a method for staging software components for deployment as a service as performed by the software development kit of FIG. 1, according to one or more embodiments.

FIG. 2 depicts a flow diagram of a method 200 for staging software components for deployment as a service as performed by the software development kit 117 of FIG. 1, according to one or more embodiments. The method 200 prepares software product files for use and stores the files on a staging server from where they may later be deployed. The method 200 compiles source code to generate software product specific metadata, binaries, such as executables, libraries, and the like. The method 200 then identifies dependencies with shared binaries, libraries, and the like. The method 200 also identifies other files needed for the proper functioning of the software product, registers the identified information and pushes the information and files to a staging server.

The method 200 starts at step 202 and proceeds to step 204. At step 204, the method 200 accesses source code for a software product. The source code may be in any software language. The source code is one or more files including computer instructions that specify the actions to be performed by a computer for a specific core software product, such as ADOBE® PHOTOSHOP®.

The method 200 proceeds to step 206, where the method 200 compiles the source code to generate binaries. For example, when source code is compiled to generate executable machine code, the file containing the machine code is called a binary. A binary is a file that contains computer readable code, as opposed to plain text or source code. The source code may reference other files, such as libraries, plug-ins, and the like, that are also binaries and add specific abilities to the software application. The files that are referenced by the source code may be specific to the core software product or they may be shared files that one or more software products may use to make a software product function properly. Compilation creates links from the executable code to these files. Metadata is created that defines what files or binaries are linked to the executable code. The method 200 proceeds to step 208.

At step 208, the method 200 identifies the shared files, or binaries from step 206 that may be needed for the software product to function properly. The machine executable and any files specific to the core software product are deployed when a software product is purchased. However, only those shared files to which the machine executable are linked are also deployed. These shared files must be identified. The method 200 identifies these dependencies and also identifies the type of dependency that is established between the shared file and the software product. These dependencies are stored in the software product metadata. Dependency types may be, but are not limited to, critical, required, and recommended. Examples of dependencies are presented in more detail below. A critical dependency is where the shared file must be present with the executable code for the software product to work. A required dependency indicates that the shared file must be present with the executable code for a specific function of the software product to work, although most of the functionality of the software product will still work without the required shared file. A recommended dependency indicates that the shared file is completely optional for the software product. Further, dependencies may be protected, meaning some shared files may only be deployed to a licensed user.

Therefore, a sub-category may exist for each type of dependency, wherein "all" denotes all non-licensed shared files and "protected" denotes all licensed shared files.

The method 200 proceeds to step 210, where the method 200 registers the metadata for the software product on a staging server. The metadata defines the structure of the files used by the software product (such as the asset associations), so they can be accessed during deployment to determine which specific files are required to run the software product on a specific user computer. The metadata is also used to identify in what order the product files should be deployed (e.g., based on their dependency type). For example, the application assets metadata may be as follows:

```
• <Product>
    o <Version>
        ■ <Platform - win | mac>
            • <bitness - 32 | 64 | universal
            • <langpacks>
                o <xx_XX_Resources>
            • <product.dependencies>
                o <dependency-type>
                    ■ <all>
                        • <list of dependencies>
                    ■ <protected>
                        • <list of dependendencies>
            • <content>
                o <all>
                    ■ <list of content - Functional | Help>
                o <protected>
                    ■ <list of content - Functional | Help
```

The Product identifies the software product, for example, ADOBE® PHOTOSHOP®. The Version identifies the software version, for example, version 14.0. The Platform identifies the type of computer platform the Product is going to be run on, for example, WINDOWS® or MAC®. The bitness entry identifies whether the files may be run on a 32-bit processor, 64-bit processor, or whether the files are universal and may be run on either type of processor. The langpacks entry identifies a list of language files that may be used with the Product. For example, if the Product is ADOBE® PHOTOSHOP® German, the language files may include files for German and English, so the program may be viewed in either language. The product dependencies are described in further detail below. The content entry identifies other content that may be included with the Product, such as help files and the like.

Metadata for a software product's dependencies may be as follows:

```
• <Product>
    o <Version>
        ■ <Platforms - win | mac>
            • <product.dependencies>
                o <dependency-type- critical | recommended|
                  required>
                    ■ <all>
                        • <list of dependencies>
                    ■ <protected>
                        • <list of dependencies>
```

For example, ADOBE® PHOTOSHOP® version 14.0 may be critically dependent on two shared technology files (sti), namely Camera-Raw, which is part of the ADOBE PDF library (PDFL), version 10.9 and XMP, version 4.0. It may be recommended that ADOBE® PHOTOSHOP® have the shared file Color-Engine, version 1.0. It may be required that ADOBE® PHOTOSHOP® have the shared file Color-Profiles. The dependency metadata would be as follows:

```
|-----{product.dependencies}
|         |-----{critical}
|         |        |-----{all}
|         |        |        |-----{sti, pdfl, 10.9}
|         |        |-----{protected}
|         |        |        |-----{sti, xmp, 4.0}
|         |-----{recommended}
|         |        |-----{all}
|         |        |        |-----{sti, color-engine, 1}
|         |-----{required}
|         |        |-----[all}
|         |        |        |-----{sti, color-profiles, 5}
```

The method 200 stores the metadata on the staging server and the method 200 proceeds to step 212, where the method 200 also stores the product assets, dependency assets, and content assets on the staging server.

The method 200 proceeds to step 214, where the method 200 also stores target system references (TSR) on the staging server. There may be various TSRs, such as Directory TSR, Registry TSR, and the like. For example, a Directory TSR defines the mapping of a file asset to a directory on a user computer. For example, a Directory TSR for a Windows platform may be as follows:

```
[ProgramFiles] → <SystemDrive>/<Program Files>
[AdobeProgramFiles] → <SystemDrive>/<Program Files>/Adobe
[ProductProgramFiles] → <SystemDrive>/<Program Files>/Adobe/<ProductName>
[CommonFiles] → <SystemDrive>/<Program Files>/<Common Files>
[AdobeCommonFiles]→<SystemDrive>/<Program Files>/<Common Files>/Adobe
[ProductCommonFiles]→<SystemDrive>/<ProgramFiles>/<Common Files>/Adobe/<ProductName>
[AdobeFunctionalContentFiles]→<SystemDrive>/<ProgramFiles>/<Common Files>/Adobe/FunctionalContent/<ProductName>
[AdobeHelpFiles]→<SystemDrive>/<ProgramFiles>/<Common Files>/Adobe/Help/<ProductName>
```

Similarly, for OS X operating system of a MAC system, the Directory TSR may be as follows:

```
[ProgramFiles] → /Applications
[AdobeProgramFiles] → /Applications/Adobe
[ProductProgramFiles] → /Applications/Adobe/<ProductName>
[CommonFiles] → /Library/Application Support
[AdobeCommonFiles]→ /Library/Application Support/Adobe
```

-continued

```
[ProductCommonFiles]→/Library/Application Support/Adobe/<ProductName>
[AdobeFunctionalContentFiles]→/Library/ApplicationSupport/Adobe/FunctionalConte
nt/<ProductName>
[AdobeHelpFiles] →/Library/Application Support Adobe/Help/<ProductName>
```

For example, the Directory TSR for ADOBE® PHOTOSHOP® may be as follows:

```
[ProgramFiles] → /Applications
[AdobeProgramFiles] → /Applications/Adobe
[ProductProgramFiles] → /Applications/Adobe/Photoshop
[CommonFiles] → /Library/Application Support
[AdobeCommonFiles]→ /Library/Application Support/Adobe
[ProductCommonFiles]→/Library/Application Support/Adobe/Photoshop
[AdobeFunctionalContentFiles]→/Library/ApplicationSupport/Adobe/FunctionalConte
nt/Photoshop
[AdobeHelpFiles] /Library/Application Support Adobe/Help/Photoshop
```

With all asset files stored on the staging server, along with the associated metadata and TSR data, it is possible to determine which specific files are required for download and where they are to be stored, in order to run the requested software application on a specific user computer. When a request is received for a software product, the request identifies the platform on which the software product is to be run, the type of processor. The metadata is used to identify what specific asset files are required to run the software program on the identified platform and processor and the TSR data identifies where on the user computer the files are to be stored, as described in further detail with respect to FIG. 3 below. The method 200 proceeds to step 216 and ends.

Figure 3:
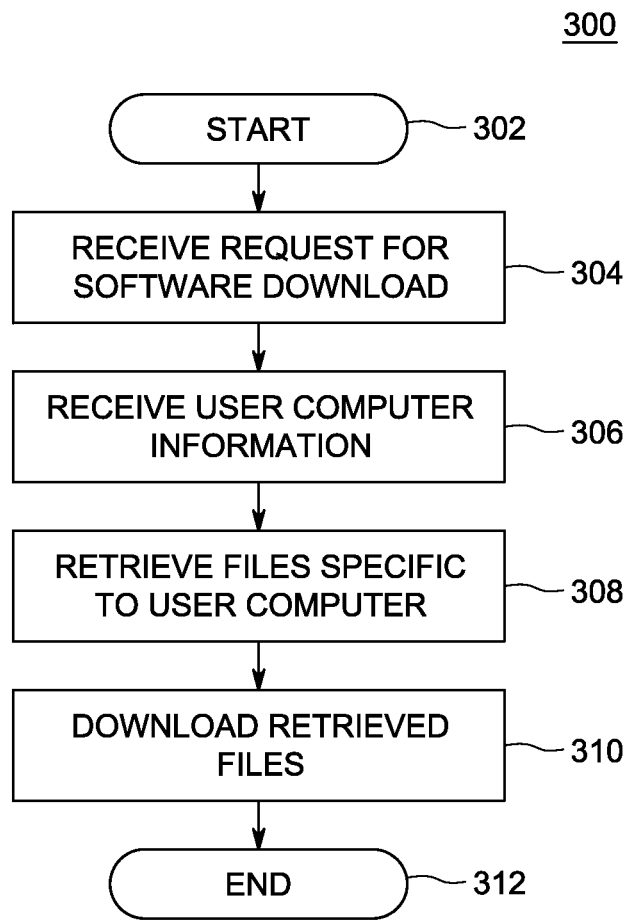
FIG. 3 depicts a flow diagram of a method for software deployment as performed by the product registration module of FIG. 1, according to one or more embodiments.

FIG. 3 depicts a flow diagram of a method 300 for deploying software as a service, as performed by the synchronization service module 155 of FIG. 1, according to one or more embodiments. The method 300 receives a request for a software application download and downloads only those application files that are required to run the requested software on the user computer based on the user computer operating system and capabilities. The method 300 starts at step 302 and proceeds to step 304.

At step 304, the method 300 receives a request for a software download. In some embodiments, the request may come directly from a user computer. In other embodiments, the request may come from a software application store that has received the request from a user computer.

The method 300 proceeds to step 306, where the method 300 receives user computer information. The user computer information includes, but is not limited to, the type of operating system on the user computer, the bitness (e.g., 32-bit, 64-bit, universal) of the user computer, and the like.

The method 300 proceeds to step 308, where the method 300 retrieves the asset files specific to the user computer that are required to run the requested software application. The method 300 accesses the metadata for the software application and determines which files are required. For example, if a user computer has a 32-bit version of WINDOWS®, the method 300 accesses the metadata to determine, in addition to the core software program assets, the additional dependency assets and content assets that are needed for the software product to function properly on the user computer. The method 300 also accesses the target system references (TSR) to ensure that upon download, the asset files will be mapped to the proper directory for storage on the user computer.

The method 300 proceeds to step 310, where the method 300 downloads the retrieved asset files to the user computer and installs the files in the directories as defined by the TSR mapping. As defined by the TSR mapping, product specific files are store in their own directory. Shared file (i.e., files that are used by more than one software product) are stored in a CommonFiles directory. Therefore, should a user purchase, for example ADOBE® PHOTOSHOP® and ADOBE® LIGHTROOM®, which share many common files, only one copy of each shared file is stored on the computer, generally in the CommonFiles directory. The method 300 may compress the asset files for faster deployment to the user computer, and if so, would uncompress them after download to the user computer.

Thus, the software product has been deployed to the user computer without the need for installers and packaging of the software product. Once in place, the software product functions normally. The method 300 proceeds to step 312 and ends.

Figure 4:
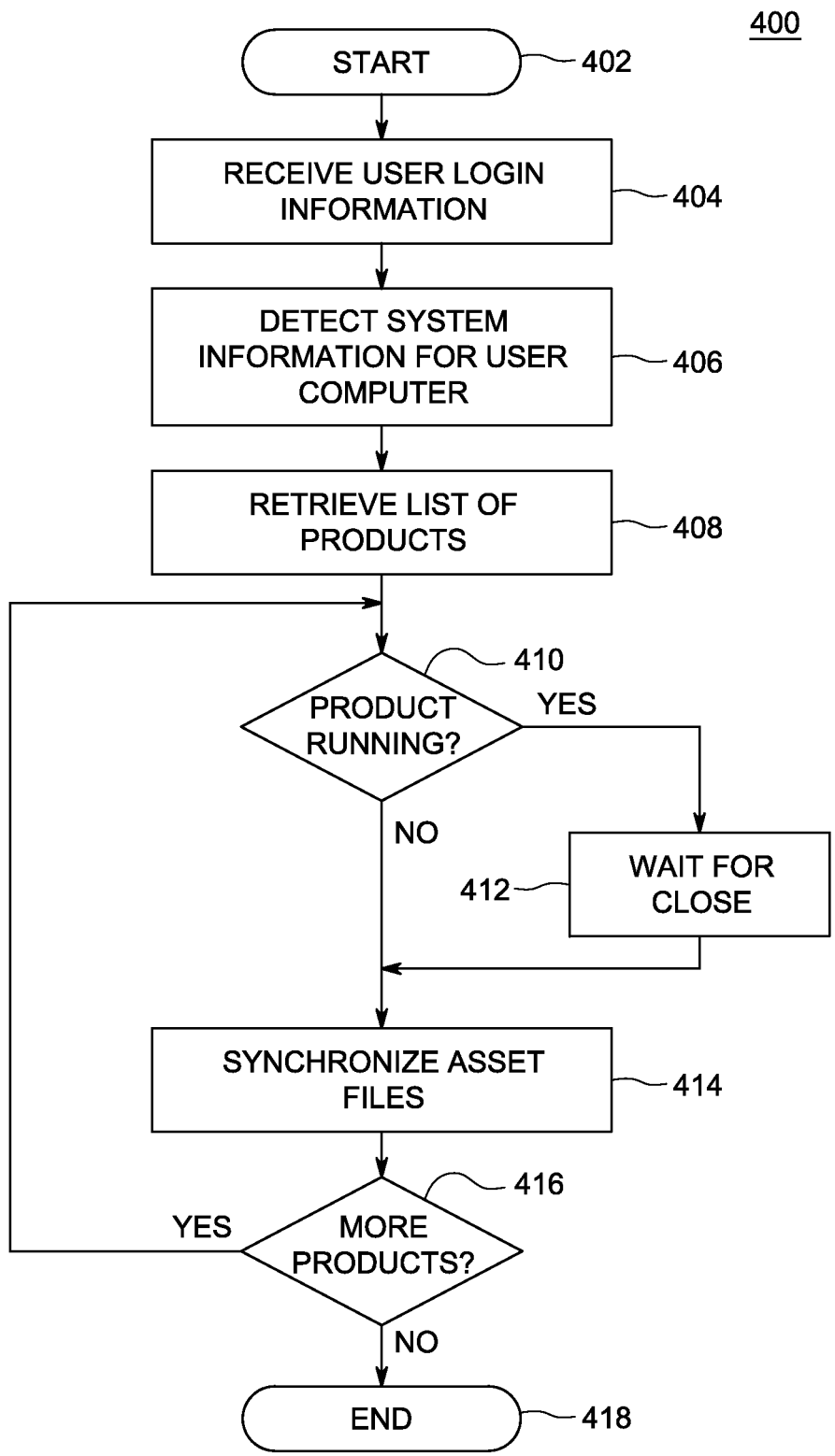
FIG. 4 depicts a flow diagram of a method for synchronizing of software updates as performed by the perpetual updater of FIG. 1, according to one or more embodiments.

FIG. 4 depicts a flow diagram of a method 400 for synchronizing of software updates as performed by the perpetual updater 164 of the user computer 106 of FIG. 1, according to one or more embodiments. Upon receiving user login information at, for example, a software application store, or the staging server itself, the method 400 determines whether any updates have been made to any software product assets that are present on the user computer associated with the user login. If any updates are available, the updates are deployed to the user's computer. The method 400 starts at step 402 and proceeds to step 404.

At step 404, the method 400 receives user login information indicating that the user computer is available. The method 400 proceeds to step 406, where the method 400 detects system information about the user computer from which the user has logged on. The method 400 identifies operating system parameters, such as the operating system, version, variant, bitness, locale, and the like. The method 400 also detects the system's capabilities, such as screen dimensions, dots per inch (DPI), and the like.

The method 400 proceeds to step 408, where the method 400 connects to a staging server and retrieves a list of products matching those on the user computer, including dependencies, etc. The method 400 synchronizes the files for each product on the user computer, one at a time.

The method 400 proceeds to step 410, where the method 400 determines if a product is running on the user computer. If the method 400 determines the program is running, the method 400 proceeds to step 412, where the method 400 waits until the program closes at which time the method 400 proceeds to step 414. If at step 410, the method 400 determines the program is not running, the method 400 proceeds directly to step 414.

At step 414, the method 400 synchronizes all asset files for the product. If any core software product assets have been updated, the method 400 downloads the updated files to replace the old file on the user computer. The method 400 also downloads the dependency assets, downloading critical dependency assets, then required dependency assets, and finally recommended dependency assets. If any dependency assets require a license, the licenses for those assets are validated as well. The language packs, help content files, and functional content are also replaced on the user computer if any of these files have been updated. All files for the software product are up-to-date on the user computer. No installation files were created or packaged to update the software application.

The method 400 proceeds to step 416 where the method 400 determines whether any more software products exist on the user computer that have not been synchronized. If the method 400 determines that there are additional software products on the user computer, the method 400 proceeds to step 410 and iterates until all software products have been synchronized. If at step 416, the method 400 determines that all software products on the user computer have been synchronized, the method 400 proceeds to step 418 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
defining, at a server in metadata, target system references and dependencies between a software product and associated dependency assets that are associated with the software product, wherein the software product comprises a plurality of software product assets and wherein, according to the metadata, at least one of the associated dependency assets is assigned to a higher priority category than at least one other of the associated dependency assets;
receiving, at the server, a request for the software product from a computer;
identifying, by the server, an operating system associated with the computer, an order of downloading the software product assets based on the priority category of the associated dependency assets assigned in the metadata, and one or more capabilities of the computer;

based on the identified operating system, the identified capabilities of the computer, and the metadata, selecting and configuring by the server, the plurality of software product assets and associated dependency assets to allow for deployment of the software product at the computer without an installer, wherein the target system references defined as part of the metadata comprise data defining one or more directories on the computer corresponding with the plurality of software product assets and the associated dependency assets based on the identified operating system associated with the computer; and sending, by the server, the selected and configured software product assets and associated dependency assets to the computer according to the order of downloading and the target system references.

2. The method of claim 1, wherein defining comprises identifying one or more dependency assets required for the software product to function.

3. The method of claim 2,
wherein dependencies are categorized as critical when the corresponding dependency assets are required for the software product to perform,
wherein dependencies are categorized as required when the corresponding dependency assets are required for a specific function of the software product to perform,
wherein dependencies are categorized as optional when the corresponding dependency assets are not required for the software product to function, and further comprising:
determining an update is available to a critical dependency asset and at least one of a required dependency asset and an optional dependency asset; and
sending all update files corresponding to the critical dependency asset before any update file corresponding to the required dependency asset and the optional dependency asset.

4. The method of claim 1, further comprising, in response to receiving user login information:
retrieving a list of software product assets matching those on the computer;
determining whether an update is available to a listed software product asset; and
sending to the computer a file associated with a software product asset to which an update applies.

5. The method of claim 1, wherein receiving the request comprises receiving operating system information for the computer.

6. The method of claim 1, wherein sending comprises compressing the software product assets, and wherein, in accordance with the metadata, the software product assets comprise assets associated with a specific software product version and specific operating system capabilities of the computer.

7. The method of claim 1, wherein sending the software product assets and associated dependency assets comprises mapping the software product assets and associated dependency assets to the one or more directories based on the target system references.

8. A computer-implemented method for deploying software as a service comprising:
defining, at a server in metadata, target system references, dependencies between a software product, and associated dependency assets that are associated with the software product, wherein the software product comprises a plurality of software product assets and wherein the target system references comprise data for mapping the software product to one or more directories based on an operating system;
receiving, at the server, a request for the software product from a computer;
determining, by the server, one or more capabilities of the computer and that the computer is associated with the operating system;
based on the determined operating system, the determined capabilities of the computer, and the metadata, selecting and configuring by the server, software product assets and associated dependency assets to allow for deployment of the software product at the computer without an installer;
generating a mapping of the selected and configured software product assets and dependency product assets to one or more destination directories based on the target system references; and
sending, from the server, the selected and configured software product assets, the associated dependency assets, and the mapping to the one or more destination directories to the computer.

9. The method of claim 8, further comprising
defining in the metadata an order of downloading the software product assets by assigning at least one of the associated dependency assets to a higher priority category than at least one other of the associated dependency assets.

10. The method of claim 9,
wherein defining comprises identifying one or more dependency assets required for the software product to function,
wherein dependencies are categorized as critical when the corresponding dependency assets are required for the software product to perform,
wherein dependencies are categorized as required when the corresponding dependency assets are required for a specific function of the software product to perform,
wherein dependencies are categorized as optional when the corresponding dependency assets are not required for the software product to function, and further comprising:
determining an update is available to a critical dependency asset and at least one of a required dependency asset and an optional dependency asset; and
sending all update files corresponding to the critical dependency asset before any update file corresponding to the required dependency asset and the optional dependency asset.

11. The method of claim 8, wherein identifying an operating system associated with the computer comprises identifying the type of operating system, version, and bitness.

12. The method of claim 8, wherein sending comprises compressing the software product assets, and wherein in accordance with the metadata the software product assets comprise assets associated with a specific software product version and specific operating system capabilities of the computer.

13. The method of claim 8, further comprising selecting and configuring, by the server, the plurality of software product assets and associated dependency assets to allow for deployment of the software product at the computer without packaged installation files.

14. A non-transitory computer readable medium for storing computer instructions that, when executed by at least one processor causes a server to perform a method for deploying software as a service comprising:

defining, at the server in metadata, target system references, dependencies between a software product, and associated dependency assets that are associated with the software product, wherein the software product comprises a plurality of software product assets;

receiving, at the server, a request for the software product from a computer; and identifying, by the server, an operating system associated with the computer, an order of downloading the software product assets based on a priority category of the associated dependency assets assigned in the metadata, and one or more capabilities of the computer;

based on the identified operating system, the identified capabilities of the computer, and the metadata, selecting and configuring by the server the plurality of software product assets and associated dependency assets to allow for deployment of the software product at the computer without an installer, wherein the target system references defined as part of the metadata comprise data defining one or more directories on the computer corresponding with the plurality of software product assets and the associated dependency assets based on the identified operating system associated with the computer; and sending, by the server, the selected and configured software product assets and associated dependency assets to the computer according to the order of downloading and the target system references.

15. The non-transitory computer readable medium of claim 14, wherein defining comprises identifying one or more dependency assets that are required for the software product to function.

16. The non-transitory computer readable medium of claim 15, wherein dependencies are categorized as critical when the corresponding dependency assets are required for the software product to perform,
wherein dependencies are categorized as required when the corresponding dependency assets are required for a specific function of the software product to perform, and wherein dependencies are categorized as optional when the corresponding dependency assets are not required for the software product to function, and further comprising:

determining an update is available to a critical dependency asset and at least one of a required dependency asset or an optional dependency asset; and sending all update files corresponding to the critical dependency asset before any update file corresponding to the required dependency asset or the optional dependency asset.

17. The non-transitory computer readable medium of claim 14, wherein receiving the request comprises receiving operating system information for the computer.

18. The non-transitory computer readable medium of claim 17, wherein the operating system information includes operating system, version, and bitness.

19. The non-transitory computer readable medium of claim 14, wherein sending comprises compressing the software product assets, and wherein in accordance with the metadata the software product assets comprise assets associated with a specific software product version and specific operating system capabilities of the computer.

20. The non-transitory computer readable medium of claim 14, wherein sending the software product assets and dependency products assets comprises mapping the software product assets and dependency product assets to the one or more directories on the computer based on the target system reference.

\* \* \* \* \*